(12) United States Patent
Wesby et al.

(10) Patent No.: US 9,879,650 B2
(45) Date of Patent: Jan. 30, 2018

(54) SYSTEM AND METHOD FOR A VERTICAL AXIS WIND TURBINE

(76) Inventors: Philip B. Wesby, Stratford-Upon-Avon (GB); Christopher Turner, Hampshire (GB)

( * ) Notice: Subject to any disclaimer, the term of this patent is extended or adjusted under 35 U.S.C. 154(b) by 1030 days.

(21) Appl. No.: 13/641,569

(22) PCT Filed: Apr. 12, 2011

(86) PCT No.: PCT/GB2011/000567
§ 371 (c)(1),
(2), (4) Date: Nov. 30, 2012

(87) PCT Pub. No.: WO2011/131923
PCT Pub. Date: Oct. 27, 2011

(65) Prior Publication Data
US 2013/0094962 A1    Apr. 18, 2013

(30) Foreign Application Priority Data

Apr. 19, 2010    (GB) .................................. 1006477.2

(51) Int. Cl.
*F03D 3/00* (2006.01)
*F03D 3/06* (2006.01)
(Continued)

(52) U.S. Cl.
CPC ............. *F03D 3/005* (2013.01); *F03D 3/062* (2013.01); *F03D 7/06* (2013.01); *F03D 13/20* (2016.05);
(Continued)

(58) Field of Classification Search
CPC .......... F03D 3/005; F03D 3/062; F03D 3/064; F03D 3/065; F03D 7/06; F03D 11/04; F03D 13/20; F03D 13/22; F05B 2240/213
See application file for complete search history.

(56) References Cited

U.S. PATENT DOCUMENTS

| 4,342,539 A | 8/1982 | Potter ............................. 416/9 |
| 4,415,312 A | 11/1983 | Brenneman ................... 416/119 |

(Continued)

FOREIGN PATENT DOCUMENTS

| DE | 34 25 313 A1 | 1/1986 | ............... F03D 3/06 |
| DE | 3542870 A1 * | 6/1987 | |

(Continued)

OTHER PUBLICATIONS

Machine translation of DE 4021260 A1 (Jan. 16, 1992) from Espacenet.*

(Continued)

*Primary Examiner* — Christopher Verdier
*Assistant Examiner* — Christopher R Legendre
(74) *Attorney, Agent, or Firm* — Sunstein Kann Murphy & Timbers LLP

(57) ABSTRACT

A system and method for a vertical axis wind turbine (VAWT) is described which can provide the basis for a new and improved wind turbine design suitable for a range of different power classes such as from 4 kilowatts to 10 megawatts. A vertical blade of chord length C is attached to a central hub via a main support strut of chord length C. The main support strut comprises two sections: a blade-support-section and a counterweight-support-section. Both the blade-support-section and the counter-weight-support-section have a blunt leading edge and a tapered trailing edge with the profile reversing either side of the hub axis. Two control struts comprising aerodynamic profiles support the blade wherein one control strut connects to the upper surface of the main support strut and the other control strut connects to the lower surface of the main support strut hub. The main support strut and the control struts provide lift to the wind turbine and reduce drag. The vertical blade and the main support strut comprise an integrated differential strain (Continued)

gauge, which is linked to a central controller and provides real time data on the integrity of the blade and strut.

13 Claims, 3 Drawing Sheets

(51) Int. Cl.
*F03D 7/06* (2006.01)
*F03D 13/20* (2016.01)

(52) U.S. Cl.
CPC ..... *F05B 2240/91* (2013.01); *F05B 2240/912* (2013.01); *F05B 2240/913* (2013.01); *F05B 2270/331* (2013.01); *F05B 2270/332* (2013.01); *F05B 2270/808* (2013.01); *Y02E 10/728* (2013.01); *Y02E 10/74* (2013.01)

(56) References Cited

U.S. PATENT DOCUMENTS

| | | | | |
|---|---|---|---|---|
| 4,430,044 A | * | 2/1984 | Liljegren | 416/119 |
| 4,483,657 A | | 11/1984 | Kaiser | 416/51 |
| 4,530,642 A | * | 7/1985 | Yang | 416/119 |
| 4,669,693 A | * | 6/1987 | Kagan | 248/318 |
| 5,474,425 A | * | 12/1995 | Lawlor | 416/223 R |
| 5,982,046 A | * | 11/1999 | Minh | 290/55 |
| 6,940,185 B2 | * | 9/2005 | Andersen et al. | 290/44 |
| 7,352,075 B2 | * | 4/2008 | Willey et al. | 290/44 |
| 7,365,448 B2 | * | 4/2008 | Stephens | 290/55 |
| 7,510,366 B2 | * | 3/2009 | Okubo et al. | 415/4.4 |
| D679,246 S | * | 4/2013 | Wesby et al. | D13/115 |
| 2013/0094962 A1 | * | 4/2013 | Wesby et al. | 416/1 |

FOREIGN PATENT DOCUMENTS

| | | | | |
|---|---|---|---|---|
| DE | 39 39 863 A1 | | 6/1991 | ............ F03D 7/00 |
| DE | 40 21 260 A1 | | 1/1992 | ............ F03D 3/06 |
| EP | 0 010 078 A2 | | 4/1980 | ............ F03D 3/06 |
| EP | 1 640 606 A1 | | 3/2006 | ............ F03D 3/06 |
| EP | 1 832 743 A1 | | 9/2007 | ............ F03D 7/04 |
| FR | 2442978 A | * | 8/1980 | |
| FR | 2 755 473 A1 | | 5/1998 | ............ F03D 11/02 |
| WO | WO 2008153490 A1 | * | 12/2008 | ............ F03D 3/005 |
| WO | WO 2009/088171 A2 | | 7/2009 | ............ F03D 3/00 |

OTHER PUBLICATIONS

Machine translation of DE 3542870 A1 (Jun. 11, 1987) from Espacenet.*
International Search Report—Application No. PCT/GB2011/000567, dated Jul. 27, 2011, *including the Written Opinion of the International Searching Authority* (10 pages).

* cited by examiner

SYSTEM AND METHOD FOR A VERTICAL AXIS WIND TURBINE

BACKGROUND OF THE INVENTION

The invention relates to a system and method for a vertical axis wind turbine (VAWT), which provides a high performance wind turbine design suitable for a range of different power classes such as from 4 kiloWatts to 10 MegaWatts. More particularly, it relates to a system and method for a vertical axis wind turbine, which comprises a single vertical blade and a counterweight, which can overcome the deficiencies of earlier VAWT designs.

In particular, the invention teaches a method, which provides higher efficiency of power generation over a range of wind speeds by using a single blade of chord length C, which is attached to a central hub via a main support strut of chord length C which extends beyond the central hub to connect to a counterweight.

In particular, the invention teaches a method, which provides higher efficiency of power generation over a range of wind speeds by providing a main support strut and two or more control struts, which have differential aerodynamic profiles such that they both strengthen and support the blade and counterweight integrated with the central hub, as well as provide lift and minimise drag.

In essence, the invention makes possible the creation of a new class of high efficiency wind turbines, which can be made of lighter and stronger materials. In particular, the blade, the support strut and the control struts are highly suited to be manufactured as a single element from a single mould thus greatly reducing the cost of manufacture as well as greatly reducing the points of failure of the turbine blade and support struts and control struts. Prior art methods would normally mould the blades and struts separately and connect each strut via separate connections, which adds significant weight to the blade structure thereby reducing its performance.

This patent application relates in part at to an earlier patent application entitled System and Method for Fluid Power Conversion filed 16 Feb. 2010 with application number GB-A-1002558.3 to Philip Wesby and Christopher Turner.

Generally, vertical axis wind turbines (VAWTs) suffer from lower performance when compared to horizontal axis wind turbines (HAWTs) due to their blades not comprising optimised chord lengths and cross sectional profiles. In addition, while VAWTs are always facing the wind whatever the direction of the wind, and can generate power as the wind direction changes, the turning blades move into and out of the wind as they turn, which causes significant stress loads on the turbine blades and support struts, once per revolution.

Consequently, solutions are needed to counter the effect of these cyclical forces.

In prior art VAWT systems the fixing-location where the strut support connects to the blade can suffer extreme fatigue each cycle as the blade moves into and out of the wind direction once per revolution. In particular the point of connection between the blade and strut is prone to failure due to the compressional and tensile forces that are exerted at this point every cycle. Any method, which is capable of mitigating the forces and fatigue of the strut to blade connection, would greatly improve the performance of VAWT wind turbines and make them more reliable.

Vertical axis wind turbines blade designs often comprise a hollow blade, which surrounds a central I-beam. The I-beam is typically made of a rigid material such as metal and provides the rigid backbone of the turbine blade and it comprises connection elements so that support struts can be firmly attached to the blade. The introduction of a rigid and often quiet heavy I-beam into the blade structure has very detrimental effects on the performance of the blade. Any method, which can avoid the need for a separate I-beam with additional fixings within the blade structure and one which keeps a more uniform weight distribution of the blade as well as keeping the blade as light as possible is highly desirable.

Generally, VAWT struts introduce drag and lower the performance of the wind turbine at any wind speed. An optimum design would also include aerodynamic profiles, which provide lift at every point of the support strut systems and which can be curvilinear adapted where needed and have a differential profile along the length of the strut.

Vertical axis wind turbines would also greatly benefit from a method to enable the wind turbine blade to accommodate the forces on the blade and strut, which change from compressional to tensional once per cycle as the blade turns into and out of the wind. The capability of the blade and strut to move would offer the means to smooth the torque over a wider part of the cycle and thus reduce fatigue upon the power transfer components to which the support strut is connected.

Conventionally wind turbines are designed to maintain the difference between the speed of the blade and the speed of the wind, otherwise known as the tip speed ratio to around 3. This ratio is maintained by the power control electronics such that power is taken off as the wind speed increases and less power is taken off as the wind speed reduces. Essentially the ability of the control algorithm to keep the tip speed ratio to its design value translates to a measure of the power efficiency of the wind turbine. The disadvantage of using a low tip speed ratio such as 3 is that the wind turbine has a corresponding narrower peak efficiency than a turbine with a higher tip speed ratio and it is harder to maintain the power output efficiency of the wind turbine when the wind speeds are changing. The peak efficiency of a wind turbine using a control algorithm, which only takes power off at a higher tip speed ratio results in higher performance because the peak efficiency is high over a wider range of wind speeds. Should the wind speed drop, a wind turbine which incorporates a power control algorithm which takes off power at a higher tip speed ratio results in a power generation efficiency which does not drop so fast as a wind turbine designed to generate power at a lower tip speed ratio. A VAWT wind turbine design, which is capable of addressing this performance deficiency, is greatly needed.

A further problem of wind turbines in general is that detailed knowledge of the integrity of the blade structure and any change in performance due to fatigue, which may occur over time, is not readily obtained. If it were possible to incorporate an intelligent strain gauge into the blade and or strut and to gather data from this strain gauge in real time, detailed knowledge of the integrity of the blade and strut as a function of cycle and as a function of time could be determined.

It is towards the creation of a new, lightweight, robust, cheaper and higher performance VAWT wind turbine design that the current invention is directed.

No systems are presently known to the applicants, which address this market need in a highly effective and economic way.

Further to the limitations of existing technologies used for designs for VAWT wind turbines, and so far as is known, no optimised system and method for a vertical axis wind turbine is presently available which is directed towards the specific needs of this problem area as outlined.

OBJECTS OF THE INVENTION

Accordingly, it is an object of the present invention to provide an improved system and method for a vertical axis wind turbine comprising a single blade and a central support strut integrated with a counterweight which can provide the basis of a new class of high performance turbine at a range of power classes.

It is a further object of one embodiment of the present invention to provide a system and method for a vertical axis wind turbine comprising a single blade and a central support strut integrated with a counterweight wherein the system is further strengthened by two or more control struts wherein at least one control strut connects the upper region of the blade to the upper surface of the central support strut near to the turning axis point of the blade and strut, and at least one control strut counterweight connects the lower region of the blade to the lower surface of the central support strut near to the turning axis point of the blade and strut.

It is a further object of one embodiment of the present invention to provide a system and method for a vertical axis wind turbine comprising a single blade and a central support strut and two or more control struts wherein the central strut profile and each of the control strut profiles are aerodynamically profiled to reduce drag.

It is a further object of one embodiment of the present invention to provide a system and method for a vertical axis wind turbine comprising a single blade and a central support strut and three control struts wherein the central strut profile and each of the control strut profiles are aerodynamically profiled to reduce drag and wherein the leading edge of the blade and the leading edge of each part of the central strut turning into wind comprises a blunt profile and the trailing edge of the blade and each trailing edge part of the central strut has a tapered section.

It is a further object of one embodiment of the present invention to provide a system and method for a vertical axis wind turbine comprising a single blade and a central support strut and two or more control struts and a counterweight wherein the profile of the central support strut is shaped in a reverse sense either side of the axis of rotation such that the counterweight support section has a profile in the reverse sense of the profile of the blade support section.

It is a further object of one embodiment of the present invention to provide a system and method for a vertical axis wind turbine comprising a single blade and a central support strut and two or more control struts and a counterweight wherein the counterweight is incorporated inside or attached to the end of the central control strut.

It is a further object of one embodiment of the present invention to provide a system and method for a vertical axis wind turbine comprising a single blade and a central support strut integrated with a counterweight wherein the central support strut comprises a blade support section and a counterweight support section and wherein the blade support section angles downward towards a central support hub and wherein the counterweight support section comprises two arms wherein a first arm angles upwards from the central support hub to connect to a counterweight and the other arm is diametrically opposite the first arm and extends downwards from the central support hub and wherein the lengths of the arms and the magnitudes of the counterweight masses are chosen to balance the moments of the blade and strut and counterweight arm system.

It is a further object of one embodiment of the present invention to provide a system and method for a vertical axis wind turbine comprising a single blade and a central support strut wherein the blade and central support strut is moulded in a single mould wherein the material used is carbon fibre or a thermoplastic glass reinforcement material such as Twintex or fibre glass or the like such that no additional connections are needed to connect the central support strut to the blade.

It is a further object of one embodiment of the present invention to provide a system and method for a vertical axis wind turbine comprising a single blade and a central support strut and two or more control struts wherein the free end of the control struts is moulded with an eye or ring fitting so that each can be connected between the blade and central control strut by a pin connection.

It is a further object of one embodiment of the present invention to provide a system and method for a vertical axis wind turbine comprising a single blade and a central support strut and two or more control struts wherein the number of control struts is chosen to optimise the VAWT strength and or counterweight balance.

It is a further object of one embodiment of the present invention to provide a system and method for a vertical axis wind turbine comprising a single blade and a central support strut and two or more control struts and a counterweight wherein the blade and support strut is connected to a central hub which is supported on a tower and wherein the central hub contains the power generation component and wherein the mass of the blade and support strut and central hub is supported vertically by a rigid rod which is firmly integrated with the base of the hub and which extends internally within the hollow tower to the base of the tower wherein the rigid rod allows the blade and strut and hub to move freely or precess around a circular axis and thus reduce the stress on the power generation component as the blade and strut rotate into and out of the direction of the wind.

It is a further object of one embodiment of the present invention to provide a system and method for a vertical axis wind turbine comprising a single blade and a central support strut and three control struts and a counterweight wherein the structure connects to a central hub by way of a teeter mechanism wherein the teeter mechanism comprises a pin connection which integrates the connection of the lower control strut.

It is a further object of one embodiment of the present invention to provide a system and method for a vertical axis wind turbine comprising a single blade and a central support strut and three control struts and a counterweight wherein the structure connects to a central hub by way of a teeter mechanism wherein the teeter mechanism and power transfer connection is mounted in a rubber block to reduce the fatigue loading on the shaft connection while allowing the structure to teeter each cycle.

It is a further object of one embodiment of the present invention to provide a system and method for a vertical axis wind turbine comprising a single blade and a central support strut and a counterweight wherein the entire structure is moulded from a single moulding process such that there are no discontinuities between the strut and the blade and wherein joint stresses are smoothly transferred between the blade and strut when the blade and strut system is rotating.

It is a further object of one embodiment of the present invention to provide a system and method for a vertical axis wind turbine comprising a single blade and a central support strut and one or more control struts and a counterweight wherein the entire structure is moulded from a single moulding process wherein the entire system is of very low weight which reduces the centrifugal forces on the blade and thus reduces the need for material to protect against these centrifugal forces.

It is a further object of one embodiment of the present invention to provide a system and method for a vertical axis wind turbine comprising a single blade and a central support strut and one or more control struts and a counterweight wherein the entire structure is moulded from a single moulding process wherein the entire system is of very low weight and thus is able to start to rotate easier as well as being able to accelerate and decelerate faster and thus makes the wind turbine more reactive to changing wind speeds and have a corresponding higher power output performance.

It is a further object of one embodiment of the present invention to provide a system and method for a vertical axis wind turbine comprising a single blade and a central support strut and one or more control struts and a counterweight wherein the entire structure is moulded from a single moulding process wherein the entire system is of very low weight and is correspondingly more reactive to changing wind speeds that it can operate at much higher rotational speeds and be designed to make use of a power control algorithm which takes off power at a tip speed ratio above four or above five.

It is a further object of one embodiment of the present invention to provide a system and method for a wind turbine wherein the blade and or the support strut or structure incorporates an intelligent strain gauge which is linked to a central control system and which can serve to gather data from this strain gauge in real time and provide a detailed knowledge of the integrity of the blade and strut as a function of cycle and as a function of time relative to the initial data output by the strain gauge.

Other objects and advantages of different embodiments of this invention will become apparent from the description to follow when read in conjunction with the accompanying drawings.

BRIEF SUMMARY OF THE INVENTION

Certain of the foregoing and related objects are readily-attained according to the present invention by the provision of a novel system and method for a vertical axis wind turbine, which serves to address the diverse requirements for creating a new class of robust, high energy-efficient, low-cost vertical axis wind turbine (VAWT) which can provide a means for improved power generation over a range of wind speeds by a wind turbine design which is suitable for a single moulding process and which avoids the need for heavy metal mountings integrated with the blade structure during manufacture.

The invention teaches a system and method for a vertical axis wind turbine which makes the first disclosure of a highly efficient design for a fully integrated multiple control strut and central support strut design wherein the blade and central support strut connection is completely integrated together as a single moulded piece of material thus avoiding the introduction of points of fatigue or failure in the design while keeping the total blade and strut support system very lightweight.

The inventive design makes possible the creation of a new class of vertical axis wind turbines, which have very high power output efficiency due to their low weight and ability to be very reactive to changes in wind speed such that it can operate at much higher tip speed ratios where the peak efficiency is high over a wider range of wind speeds.

The wind turbine further comprises an intelligent strain gauge integrated with the structure of the blade and central control strut which is linked to a central control system and which serves to provide real time data on the dynamic loads experienced by the wind turbine blade and strut and thereby give data to modify the performance of the power generation of the turbine as well as providing a measure of fatigue with age of the blade and strut relative to the initial strain gauge readings.

Other objects and features of the present invention will become apparent from the following detailed description considered in connection with the accompanying drawings, which disclose several key embodiments of the invention. It is to be understood, however, that the drawings are designed for the purpose of illustration only and that the particular descriptions of the invention in the context of the wind turbine application are given by way of example only to help highlight the advantages of the current invention and do not limit the scope of the invention.

DESCRIPTION OF A PREFERRED EMBODIMENT

Reference will now be made in detail to some specific embodiments of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as defined by the appended claims.

The following description makes full reference to the detailed features, which may form parts of different embodiments as outlined in the objects of the invention. In the following example reference is made to a system comprising 2 or more control struts and an externally or internally profiled counterweight while it is to be understood that the invention covers other embodiments which use different numbers of control struts and the counterweight may be fully incorporated in to the aerodynamic profile of the counterweight support section of the central support strut.

Figure 1:
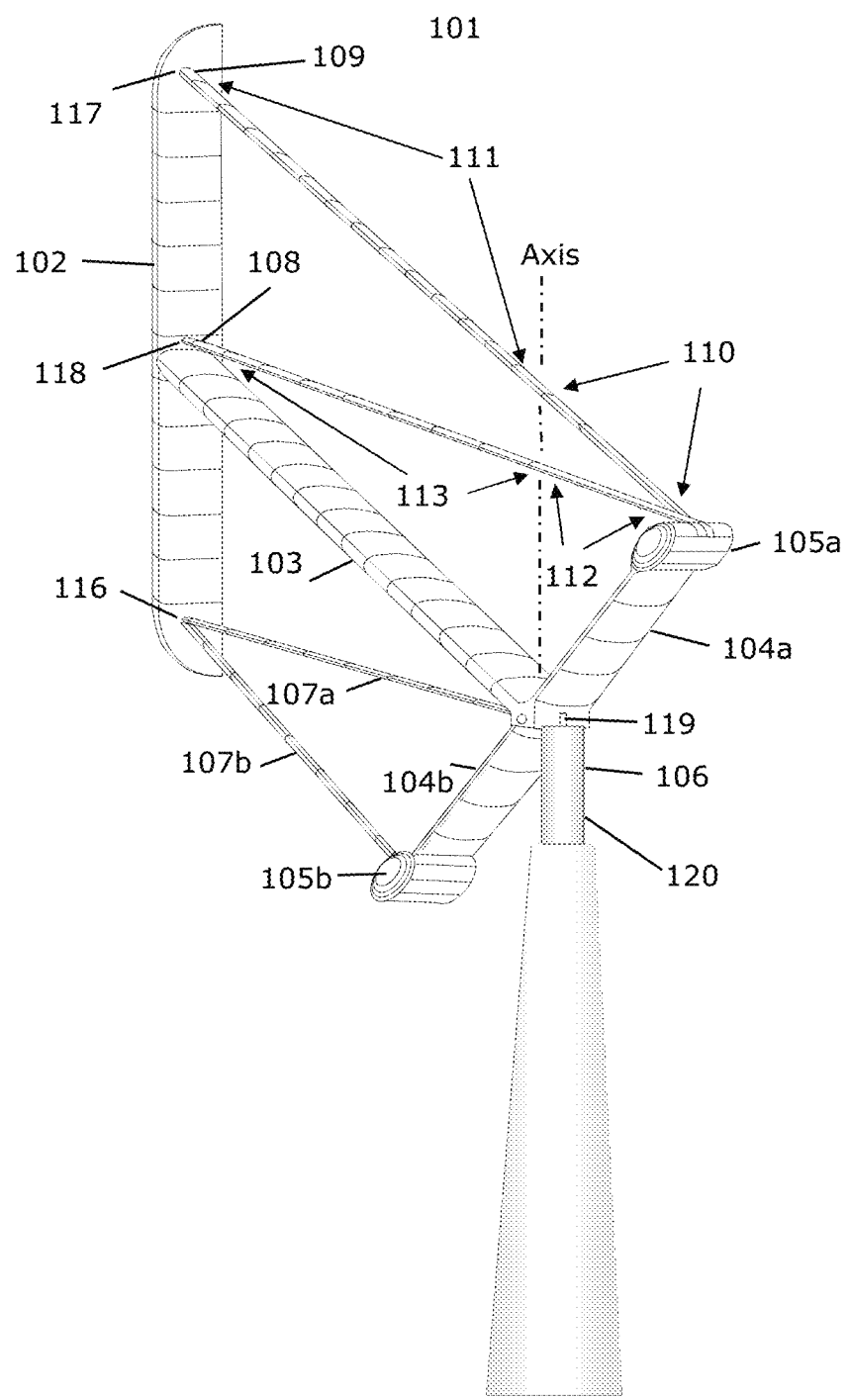
FIG. 1 illustrates a schematic of a VAWT wind turbine according to one embodiment of the invention.

Referring now in detail to the drawings and in particular FIG. 1 thereof, therein illustrated is a schematic of a VAWT wind turbine (101) according to the current invention. A blade (102) is connected to a central support strut, which comprises a blade support section (103) and a counterweight support section comprising two arms (104a, 104b). Counterweights (105a, 105b) are integrated with the ends of the counterweight support section arms. In a preferred embodiment the blade comprises an inner I-beam rigid support structure formed from the same material as the blade during the moulding process.

In this example four control struts (107a, 107b, 108, 109) are shown wherein the lower control strut is integrated with the connection to the power transfer components within the VAWT nacelle (106) by way of a slot (119). The free end of the lower strut (107a) comprises an eye or ring connection which matches the slot (119) in the lower part of the central support strut and which is integrated with the central support strut by way of a pin which passes through the connection shaft (120). This pin and shaft connection (120) integrates the central support strut and the lower control strut with the power control element such as a Permanent Magnet Generator (PMG) wherein the PMG also comprises a mounting with a shaft hole through which the pin can be passed.

The four control struts (107a, 107b, 108, 109) may be moulded with the inner surface structure of the blade and thereby form a continuous single piece of material having a structure of generally uniform properties with no points of failure or weakness anywhere. Alternatively, the control struts may be moulded separately. The locations (116, 117) of the control struts are generally at the centre (118) of the blade and equally spaced from the ends of the blade respectively. The choice of the locations (116, 117) will be determined by the shape and strength properties of the blade. Similarly, the central control strut may be fully integrated with the blade support section (103) of the central support strut such that the control strut (108) and the blade connection to the central support strut meet deep within the inner structure of the blade at the I-beam.

The other two control struts (108, 109) also comprise ring or eye connections or the like so that they can be firmly integrated with the counterweight (105). The counterweight comprises a suitable slot to receive the two free ends of the control struts (108, 109) and a pin and shaft connection (not shown) or the like may be used to firmly fix the control struts to the counterweight.

As mentioned earlier, in alternative embodiments the counterweight system may comprise a massive element, which is integrated with the I-beam structure of the counterweight support section and be fully internal to the said section wherein there is no external counterweight profile. Correspondingly, the control struts (108, 109) will be attached to appropriate fixtures at the end of the counterweight support sections (104a, 104b).

The aerodynamic profile of the control struts and the blade support section and counterweight support section of the central support strut is of particular importance to the design of the VAWT according to the invention. That part of the blade or of the central support strut or of the control struts which is turning into wind has a blunt profile. The trailing edge of the blade and the trailing edge of the central support strut tapers to a sharp edge.

Consequently, because the blade support section and the counterweight support section are positioned either side of the axis of rotation, their front-to-back aerodynamic profiles are shaped in the countersense relative to each other. Similarly, the upper two struts (108, 109) comprise aerodynamic profiles which reverse where the control struts cross the axis of rotation (Axis).

On control strut (108) the profile on the section (113) is opposite to the profile on the section (112). On control strut (109), the profile on section (111) is opposite to the profile on the section (110).

To further improve the performance of the struts and to give them even better lift characteristics, the profiles may be differentially adapted along their length. This curvilinear adaption provides a profile, which changes according to the distance from the axis of rotation (Axis).

In a preferred embodiment, the width of the central support strut (103, 104) has similar dimensions as the chord length of the blade (102). The control struts (107, 108, 109) may comprise widths, which are approximately 4%-25% of the chord of the blade.

In summary, this design shows a high performance VAWT, which uses a balanced single blade system using aerodynamic struts and a counterweight all made from very lightweight material as a single moulding. The single blade design enables the blade to be made thicker and thus stiffer. The length of the blade determines the leverage of the aerodynamic forces and the thickness determines the torque resisting bending. Compared to a 3-blade VAWT design, for any particular power rating, the 1-blade system enables the construction of a single blade, which has three times the chord and three times the thickness of the equivalent 3-blade design which is thus stiffer and thus more power efficient than the equivalent 3-blade design.

In other words, a 1-blade VAWT system, which has the same power rating as a 3-blade VAWT system, will give the same bending resistance or stiffness from less material and consequently is cheaper to manufacture.

Figure 2:
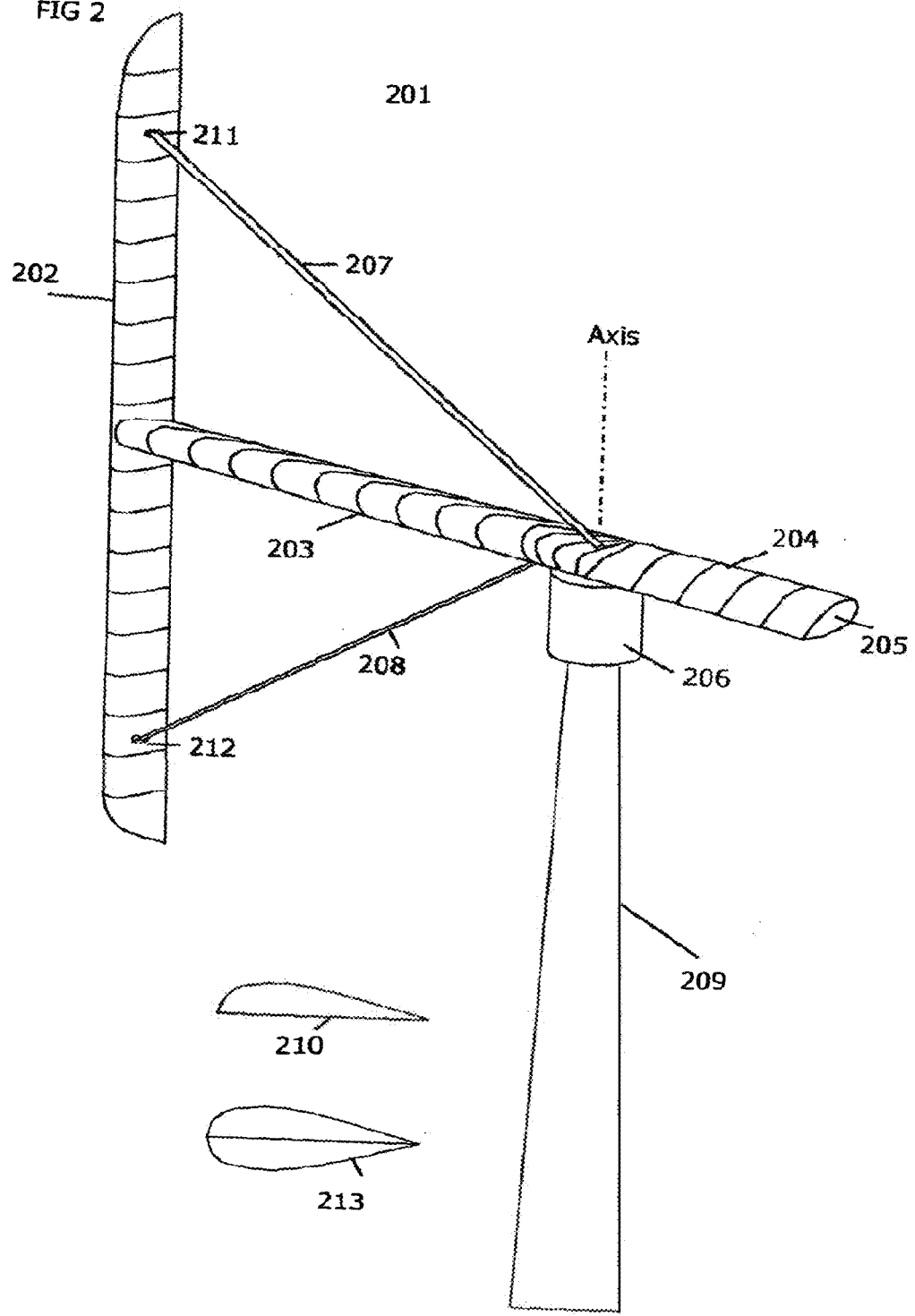
FIG. 2 illustrates a schematic of a VAWT wind turbine according to a second embodiment of the invention.

Now with reference to FIG. 2 is shown a second embodiment of a vertical axis wind turbine (201) according to the invention. The vertical blade (202) is connected to a central support strut comprising a support section (203) and a counterweight section (204). The counterweight (205) is integrated inside the counterweight section (204). The blade (202) is moulded together with the central support strut comprising support section (203) and counterweight section (204) such that the blade and support strut form a single structure.

The blade and central support strut rotate about an axis (Axis) as shown and the central support strut connects to a power transfer component within the central hub (206) of the wind turbine, which is supported by a tower (209). Two control struts (207, 208) firmly connect the blade to the central support strut near to the axis.

Either side of the axis as shown, each section of the central support strut (203) and (204) comprises a reverse aerodynamic profile relative to the other.

The counterweight (205) may comprise a first mass of material and a second moveable and rotatable non-uniform or wedge-shaped mass, which can be adjusted through a central channel from the exterior end of the counterweight section (204). Fine balancing of the vertical axis wind turbine blade and strut is thus achieved by adjusting the location and the attitude of the non-uniform or wedge-shaped mass. In different embodiments the wedge-shaped mass may be connected to an internal servo motor or the like and finely adjusted by control of this motor. In other embodiments, the servo motor may be used to adjust the location of the wedge-shaped mass dynamically and thus optimise the balance of the turbine as it rotates.

The control struts (207, 208) each comprise a carbon fibre tape comprising a semi-aerodynamic profile (210) as shown wherein each tape starts near to the axis of the system (Axis) and extends out towards the blade (202) where each enters a hole respectively in the blade surface (211, 212) and wraps around a pin integrated within the structure of the blade and then exits the blade and returns to be firmly attached to the central support strut near to the axis. The two flat sides of the semi-aerodynamic tape are then glued firmly together or set using heat or by ultrasonic welding to form the completed profile (213). The other ends of the control struts (207, 208) may also be attached in a similar way to a pin embedded in the structure of the control strut near to the axis wherein each tape wraps around the pin and exits the structure.

Alternatively, the control strut tape may attach to an eye structure, which is attached via a pin to a fixture in the surface of the control strut.

Figure 3:
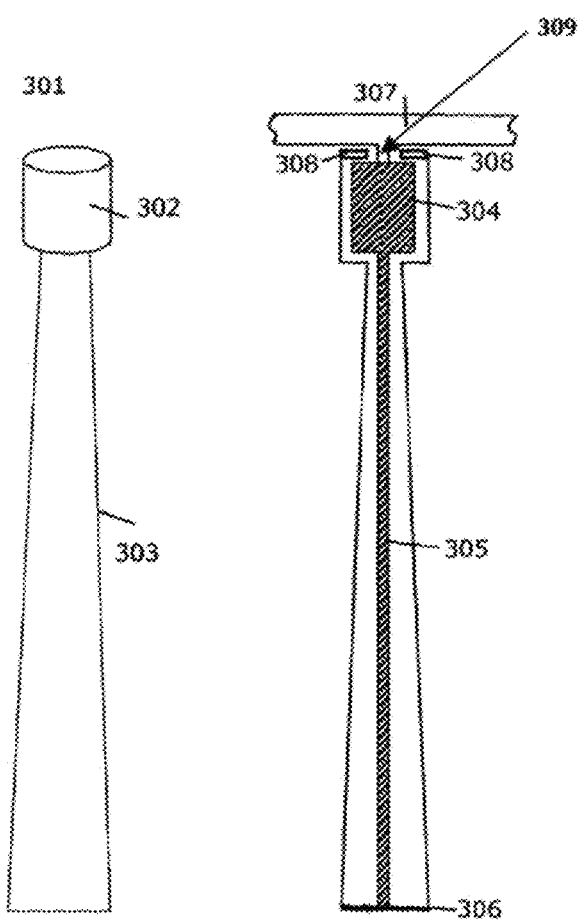
FIG. 3 illustrates a schematic of the blade, strut and hub support mechanism.

Now with reference to FIG. 3 is shown the support mechanism for the hub.

The tower and central hub system (301) comprises the wind turbine nacelle or hub (302) and the vertical tower (303). To reduce the weight and cost of the tower, the heavy power generation component (304) within the nacelle (302) has its outer structure integrated with a rigid support rod (305), which is capable of supporting the weight of the entire blade and support strut and central hub system. The base of the support rod (305) is firmly attached to a base plate (306) at the base of the tower. In some embodiments, the support rod (305) may have a rigidity modulus that enables the support rod (305) to flex during rotation and/or enable the rod to move within the internal space of the tower (e.g., thereby reducing the dynamic loading on the tower and the tower foundations). The central support strut (307) for the blade is partially shown and this connects to the power generation component within the central hub by a shaft (309). This arrangement makes possible the movement of the axis of rotation within the space between the shaft (309) and a ring bearing (308).

As the blade turns into and out of wind, the blade and strut system is thus allowed to move or precess around the axis of rotation within the confines of the opening in the ring bearing (308). In this way the entire weight of the blade and strut and central hub is supported only by the rigid rod (305) and not by the external tower (303). For maintenance the ring bearing is easily replaced should it become worn.

To manufacture the system according to the invention many materials be used. In one preferred embodiment, the blade and strut system may be moulded using a single T-shaped mould.

The mould comprises two halves which when joined together comprises a cut profile in the shape of the blade and the central support strut. The moulding process involves placing blade material such as Twintex or carbon fibre into each of the mould halves and to use bags inside the mould, which press the material against the mould during the curing process where the mould system is placed into an oven which is evacuated to a very low air pressure.

The tapered ends of the blade, or blade tips, may be manufactured separately and bonded to the blade structure afterwards. Alternatively, one blade tip may be moulded as part of the mould and the other added separately after manufacture using ultrasonic welding or suitable bonding material.

The I-beam support is formed during the moulding process by creating, for example, two or three separate bags inside the blade and flaps of blade material, which fuse together during curing either side of the bags.

The hollow channels within the strut and blade may be filled after moulding with polyurethane foam or the like. This will increase the rigidity of the blade and struts and reduce the amount of blade surface material used thereby reducing the manufacturing cost of the VAWT wind turbine.

In alternative embodiments the moulding process may alternatively involve using a silicone bag under high pressure to press the material against the mould surface to form the structure of the VAWT. This method avoids the need for an evacuated oven, which makes the moulding process less prone to errors of manufacture should the vacuum pump fail.

While only several embodiments of the present invention have been described in detail, it will be obvious to those persons of ordinary skill in the art that many changes and modifications may be made thereunto without departing from the spirit of the invention. The present disclosure is for illustration purposes only and does not include all modifications and improvements, which may fall within the scope of the appended claims.

What is claimed is:

1. A vertical axis wind turbine comprising:
a vertical wind turbine support tower;
a single blade having an aerodynamic profile;
a central support strut having an aerodynamic profile, the central support strut having a blade support section, a counterweight support section, and a counterweight, the single blade being connected at right angles to the blade support section of the central support strut; and
a central control system,
wherein the single blade is integrated with the central support strut and is configured to rotate about an axis, and the central support strut comprises a shaft having a central axis,
the said counterweight being integrated with or attached to the counterweight support section, and wherein
said central support strut operably connected to a power generation component, wherein
the power generation component is configured to connect to a separate single support rod within the support tower, the support rod configured to substantially support the combined weight of the single blade, the central support strut, and the power generation component,
the power generation component and support rod configured to allow the axis of rotation of the central support strut to move within the confines of at least one ring bearing such that the axis of rotation of the central support strut is configured to freely precess in a circular motion around the central axis of the shaft.

2. A vertical axis wind turbine as disclosed in claim 1, wherein two or more control struts connect the single blade to the central support strut.

3. A vertical axis wind turbine as disclosed in claim 2, wherein the two or more control struts have an aerodynamic profile, and are formed from a tape having a semi-aerodynamic profile.

4. A vertical axis wind turbine as disclosed in claim 2, said control struts comprising chord lengths being 4%-25% of a chord length of the single blade.

5. A vertical axis wind turbine as disclosed in claim 1, wherein the precession of the axis of rotation of the central support strut around the central axis of the shaft reduces the transmitted forces on the power generation component as said central support strut and said single blade rotates into and out of the direction of the wind.

6. A vertical axis wind turbine as disclosed in claim 1, wherein material of the support rod has a rigidity modulus to enable the support rod to flex during rotation.

7. A vertical axis wind turbine as disclosed in claim 1, wherein material of the support rod has a rigidity modulus to enable the support rod to precess within an internal space of the support tower.

8. A vertical axis wind turbine as disclosed in claim 1, wherein said single blade and said central support strut include a strain gauge linked to the central control system, said central control system configured to gather data from said strain gauge in real time for further processing and determining an integrity of said single blade and said central support strut as a function of cycle and as a function of time relative to initial data output by said strain gauge.

9. A vertical axis wind turbine as disclosed in claim 1, wherein the central control system is configured to gather data on dynamic loads on the single blade and the central support strut wherein said data is used to modify power generation of the wind turbine as a function of dynamic load and/or to provide a measure of any fatigue on the single blade and the central support strut with age relative to initial strain gauge measurements.

10. A vertical axis wind turbine as disclosed in claim 1, wherein leading edges of said single blade and said central support strut turning into wind comprising a blunt profile and trailing edges of said single blade and said central support strut comprising a tapered section, wherein an aerodynamic profile of the blade support section being in the opposite sense to the aerodynamic profile of an counterweight support section.

11. A vertical axis wind turbine as disclosed in claim 1 wherein material used for the single blade and the central support strut being selected from the group consisting of carbon fibre epoxy composite, thermoplastic composite, polypropylene glass fibre composite, melamine formaldehyde, nylon, hemp fibres in epoxy resin, wood, grass, and bamboo.

12. A vertical axis wind turbine as disclosed in claim 1, wherein the central control system takes off power at different points in a rotational cycle as a function of wind speed and wind direction for optimising performance of the wind turbine.

13. A vertical axis wind turbine as disclosed in claim 1, further comprising:
the shaft of the central support strut connected to the power generation component, the shaft extending through an opening through the at least one ring bearing, the opening sized such that there is a space between an inner diameter of the opening and an outer diameter of the shaft, the space configured to allow the axis of rotation of the central support strut to precess around the central axis of the shaft.

* * * * *